(12) United States Patent
Fujihira et al.

(10) Patent No.: US 11,168,650 B2
(45) Date of Patent: Nov. 9, 2021

(54) EGR SYSTEM OF ENGINE

(71) Applicant: Mazda Motor Corporation, Hiroshima (JP)

(72) Inventors: Shinji Fujihira, Aki-gun (JP); Hiroshi Kinoshita, Aki-gun (JP); Takashi Kariya, Aki-gun (JP); Takayuki Tominaga, Aki-gun (JP); Tatsuya Takahata, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/176,420

(22) Filed: Feb. 16, 2021

(65) Prior Publication Data
US 2021/0310447 A1 Oct. 7, 2021

(30) Foreign Application Priority Data
Apr. 1, 2020 (JP) .............................. JP2020-065764

(51) Int. Cl.
*F02M 26/22* (2016.01)
*F02F 1/40* (2006.01)
*F02D 41/00* (2006.01)
*F02B 47/08* (2006.01)
*F02F 1/14* (2006.01)
(Continued)

(52) U.S. Cl.
CPC ............... *F02M 26/22* (2016.02); *F02F 1/14* (2013.01); *F02M 26/01* (2016.02); *F02M 26/14* (2016.02); *F02M 26/17* (2016.02); *F02M 35/10222* (2013.01)

(58) Field of Classification Search
CPC ........ F02M 26/01; F02M 26/13; F02M 26/14; F02M 26/17; F02M 26/22; F02M 26/24; F02M 26/28; F02M 26/29; F02M 26/30; F02M 26/32; F02M 35/10222; F02F 1/14; (Continued)

(56) References Cited

U.S. PATENT DOCUMENTS 9,435,297 B2 * 9/2016 Shimizu ................. F02M 26/41
9,518,536 B2 * 12/2016 Sekiya ................... F02M 26/12
(Continued)

FOREIGN PATENT DOCUMENTS

JP 2002004955 A * 1/2002 ............. F02M 26/31
JP 2019157800 A 9/2019

*Primary Examiner* — Grant Moubry
(74) *Attorney, Agent, or Firm* — Alleman Hall Creasman & Tuttle LLP

(57) ABSTRACT

An engine EGR system is provided, which includes an engine body, an intake passage, an exhaust passage and an EGR passage configured to recirculate exhaust gas as EGR gas to the intake passage. The EGR passage includes an EGR cooler and an EGR internal passage constituting the EGR passage upstream of the EGR cooler, and including a passage passing through a cylinder head. The EGR internal passage has a bent pipe part including a first bent portion at which an upstream portion of the EGR internal passage is bent away from a gas inflow port of the EGR cooler, a second bent portion located downstream of the first bent portion and bending the EGR internal passage toward the gas inflow port, and an intermediate portion connecting the first and the second bent portions by being disposed therebetween. The water-cooling passage is disposed around the bent pipe part.

18 Claims, 10 Drawing Sheets

(51) Int. Cl.
*F02M 26/01* (2016.01)
*F02M 26/14* (2016.01)
*F02M 35/10* (2006.01)
*F02M 26/17* (2016.01)

(58) Field of Classification Search
CPC ....... F02F 1/10; F02F 1/36; F02F 1/40; F02D 41/0025; F02D 41/0047; F02B 47/08
See application file for complete search history.

(56) References Cited

U.S. PATENT DOCUMENTS

| | | | |
|---|---|---|---|
| 9,664,153 B2* | 5/2017 | Beyer | F02M 26/32 |
| 9,689,303 B2* | 6/2017 | Harada | F02M 26/30 |
| 2016/0084206 A1* | 3/2016 | Noda | F02D 21/08 |
| | | | 123/568.21 |
| 2016/0186704 A1* | 6/2016 | Murotani | F02M 26/28 |
| | | | 123/568.12 |
| 2019/0072056 A1* | 3/2019 | Yoon | F02M 26/28 |
| 2020/0378347 A1* | 12/2020 | Reinhart | F02M 26/30 |

* cited by examiner

EGR SYSTEM OF ENGINE

TECHNICAL FIELD

The present disclosure relates to an exhaust gas recirculation (EGR) system of an engine.

BACKGROUND OF THE DISCLOSURE

There is known a technology for engines for driving a vehicle, etc., that brings a portion of exhaust gas (also referred to as EGR gas) back into intake gas, so-called EGR (Exhaust Gas Recirculation). A majority of EGR systems that perform EGR are usually installed with an EGR cooler to cool high-temperature EGR gas.

Regarding this technology, for example JP2019-157800A discloses an engine including a cylinder head formed therein with a part of an EGR internal passage upstream of an EGR cooler. In the engine, a part of the EGR internal passage on the EGR cooler side inclines downwardly from the EGR cooler, so that condensed water generated by the EGR cooler is prevented from accumulating in the EGR internal passage.

Depending on an operating condition of the EGR system, a heat amount of the EGR gas may become excessive with respect to the performance of the EGR cooler. The excessive heat amount of the EGR gas degrades the durability of the EGR cooler.

SUMMARY OF THE DISCLOSURE

The present disclosure is made in view of the above situation, and one purpose thereof is to provide an exhaust gas recirculation (EGR) system of an engine, which excels in durability of an EGR cooler by effectively removing the excess heat of EGR gas flowing into the EGR cooler.

According to one aspect of the present disclosure, an EGR system of an engine is provided, which includes an engine body including a combustion chamber in which combustion is performed, and a cylinder head provided in an upper part of the engine body and having a water-cooling passage through which cooling water flows. The system includes an intake passage connected to the cylinder head and through which intake air is introduced into the combustion chamber, an exhaust passage connected to the cylinder head and through which exhaust gas is discharged from the combustion chamber, and an EGR passage connecting the exhaust passage to the intake passage and configured to recirculate the exhaust gas as EGR gas, from the exhaust passage to the intake passage.

The EGR passage includes an EGR cooler configured to cool the EGR gas, and an EGR internal passage constituting the EGR passage upstream of the EGR cooler, and including a passage passing through the cylinder head. The EGR internal passage has a bent pipe part including a first bent portion at which an upstream portion of the EGR internal passage is bent away from a gas inflow port of the EGR cooler, a second bent portion located downstream of the first bent portion and bending the EGR internal passage toward the gas inflow port, and an intermediate portion connecting the first bent portion to the second bent portion by being disposed therebetween. The water-cooling passage is disposed around the bent pipe part.

According to this engine EGR system, the EGR internal passage including the passage passing through the cylinder head is provided in the part of the EGR passage upstream of the EGR cooler. The EGR internal passage is not piping arranged around the engine, but a passage passing through the components constituting the engine. The EGR internal passage may pass inside only the cylinder head, or additionally pass inside the other components.

Inside the cylinder head, the water-cooling passage through which cooling water flows is formed in order to cool the combustion chamber. The system is devised to use this cooling water so that the EGR gas flowing through the EGR internal passage can be cooled efficiently.

As described above, the EGR internal passage has the bent pipe part including the first bent portion, the intermediate portion, and the second bent portion in this order from upstream to downstream. The first bent part bends the upstream portion of the EGR internal passage away from the gas inflow port of the EGR cooler and the second bent part bends the EGR internal passage toward the gas inflow port.

As a result, the EGR internal passage is smoothly connected to the gas inflow port, which generates a smooth flow of the EGR gas. Moreover, the EGR internal passage is extended, and thus, a sufficient length of the portion for cooling the EGR gas is secured. Furthermore, the first bent portion and the second bent portion are sharply bendable.

When such a sharply bent pipe part is formed in the EGR internal passage, the EGR gas flowing in the EGR internal passage collides with a wall surface thereof at each bent section. The flow of EGR gas stagnates at the bent pipe part. As a result, heat dissipation of the EGR gas improves in the bent pipe part.

In addition, since the water-cooling passage is disposed around the bent pipe part, the heat exchange between the EGR gas and the cooling water is promoted. That is, the EGR gas is effectively cooled by the combination of the bent pipe part and the water-cooling passage. As a result, the excess heat of the EGR gas flowing into the EGR cooler is removed effectively, and durability of the EGR cooler improves.

The EGR cooler may be located on an upper side of the EGR internal passage, and a portion of the EGR internal passage downstream of the second bent portion may extend upward toward the gas inflow port.

According to this configuration, since the downstream portion of the EGR internal passage extends toward the gas inflow port, the EGR internal passage is smoothly connected to the gas inflow port, which generates a smooth flow of the EGR gas. Moreover, since the downstream portion of the EGR internal passage extends upward, even if condensed water is generated in the EGR internal passage, the condensed water does not flow into the downstream side of the EGR internal passage to negatively affect the EGR cooler.

At least a portion of the EGR internal passage upstream of the first bent portion may intersect the water-cooling passage.

According to this configuration, the upstream portion of the EGR internal passage which intersects the water-cooling passage, is indirectly in contact with the cooling water flowing in the water-cooling passage via a pipe wall thereof. Therefore, the EGR gas flowing in the EGR internal passage is efficiently cooled by the cooling water when passing through the contact area, and thus, the EGR gas is effectively cooled.

The EGR system may further include a water outlet attached to an end surface of the cylinder head and including therein a plurality of outflow passages configured to distribute cooling water to a plurality of water outflow ports, respectively, the outflow passages and the water outflow ports constituting a portion of the water-cooling passage. A downstream portion of the bent pipe part including the second bent portion may be located inside the water outlet and may partially project into a first outflow passage having a largest flow channel cross section among the plurality of outflow passages.

According to this configuration, the EGR internal passage can be extended by the water outlet not only to inside the cylinder head but also into the water outlet. The effectively coolable range is expanded, and the EGR gas is cooled even more.

Moreover, inside the water outlet, the plurality of outflow passages (part of the water-cooling passage) through which the cooling water flows are formed, and the downstream portion of the bent pipe part is located inside the water outlet. Therefore, by the heat exchange with the cooling water flowing in the outflow passages, the EGR gas flowing in the downstream portion of the bent pipe part can be cooled.

In addition, the part of the downstream portion of the bent pipe part projects into the first outflow passage having the largest flow channel cross section. The flow rate of the cooling water flowing in the first outflow passage with the largest flow channel, is the largest among the outflow passages. Since the heat exchange is performed with the cooling water with the highest heat exchange efficiency, the heat exchange between the EGR gas and the cooling water is promoted, and the EGR gas is further cooled.

The downstream portion of the bent pipe part other than the portion projecting into the first outflow passage may be in contact with a second outflow passage that is different from the first outflow passage.

In the downstream portion of the bent pipe part, the portion projecting into the first outflow passage excels in the cooling performance, whereas the portion not projecting into the first outflow passage is away from the first outflow passage, which is poor in the cooling performance in relation to the first outflow passage. In this regard, in this engine EGR system, the portion not projecting into the first outflow passage is brought into contact with the second outflow passage. Thus, also in such a portion, the EGR gas can be cooled by the heat exchange with the cooling water flowing in the second outflow passage. Therefore, the cooling performance of the EGR gas can be improved more.

When the engine operates in a high load range including a full load, the engine may perform combustion with a stoichiometric air-fuel ratio as a target value.

Normally when the engine operates in the high load range, a combustion temperature rises and abnormal combustion occurs. Therefore, the amount of fuel is increased and latent heat of vaporization of the fuel is used to cool a mixture gas in order to avoid abnormal combustion. However, in this control, the fuel amount increases and therefore fuel efficiency degrades.

Meanwhile, when performing combustion at the stoichiometric air-fuel ratio, fuel efficiency is improved, but abnormal combustion cannot be avoided because the latent heat of vaporization cannot be used. If the circulation amount of the EGR gas is increased in this case, an oxygen concentration of the intake air decreases, and thus abnormal combustion can be avoided. However, by performing the combustion at the stoichiometric air-fuel ratio, the temperature of the exhaust gas increases.

Therefore, when the engine operates in the high load range, if performing the combustion at the stoichiometric air-fuel ratio while the circulation amount of the EGR gas is increased to avoid abnormal combustion, the EGR gas is recirculated at a higher temperature and by a larger amount compared to a conventional example. The heat amount of the EGR gas becomes excessive with respect to the performance of the EGR cooler, and thus the durability of the EGR cooler degrades.

In this regard, according to this engine EGR system, as described above, the excess heat of the EGR gas flowing into the EGR cooler can be removed effectively. Therefore, even when the high temperature and large amount of EGR gas is recirculated, the heat amount of the EGR gas can be suppressed from becoming excessive with respect to the performance of the EGR cooler. As a result, fuel efficiency improves.

DETAILED DESCRIPTION OF THE DISCLOSURE

Hereinafter, one embodiment of a present disclosure is described. Note that the following description is merely an example and is not to limit the present invention, its application, or its use.

Figure 1:
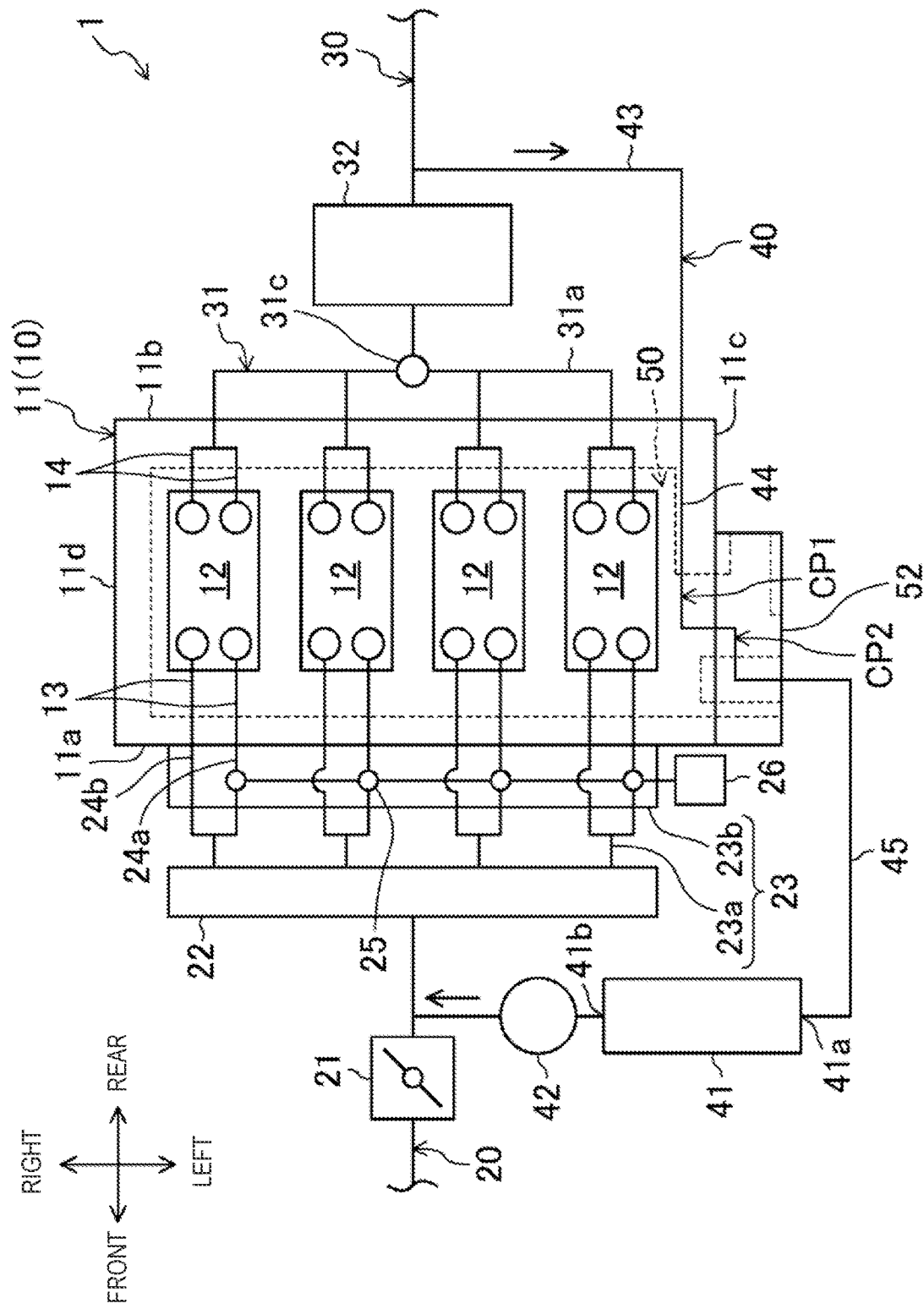
FIG. 1 is a diagram illustrating main devices of an engine.
Figure 2:
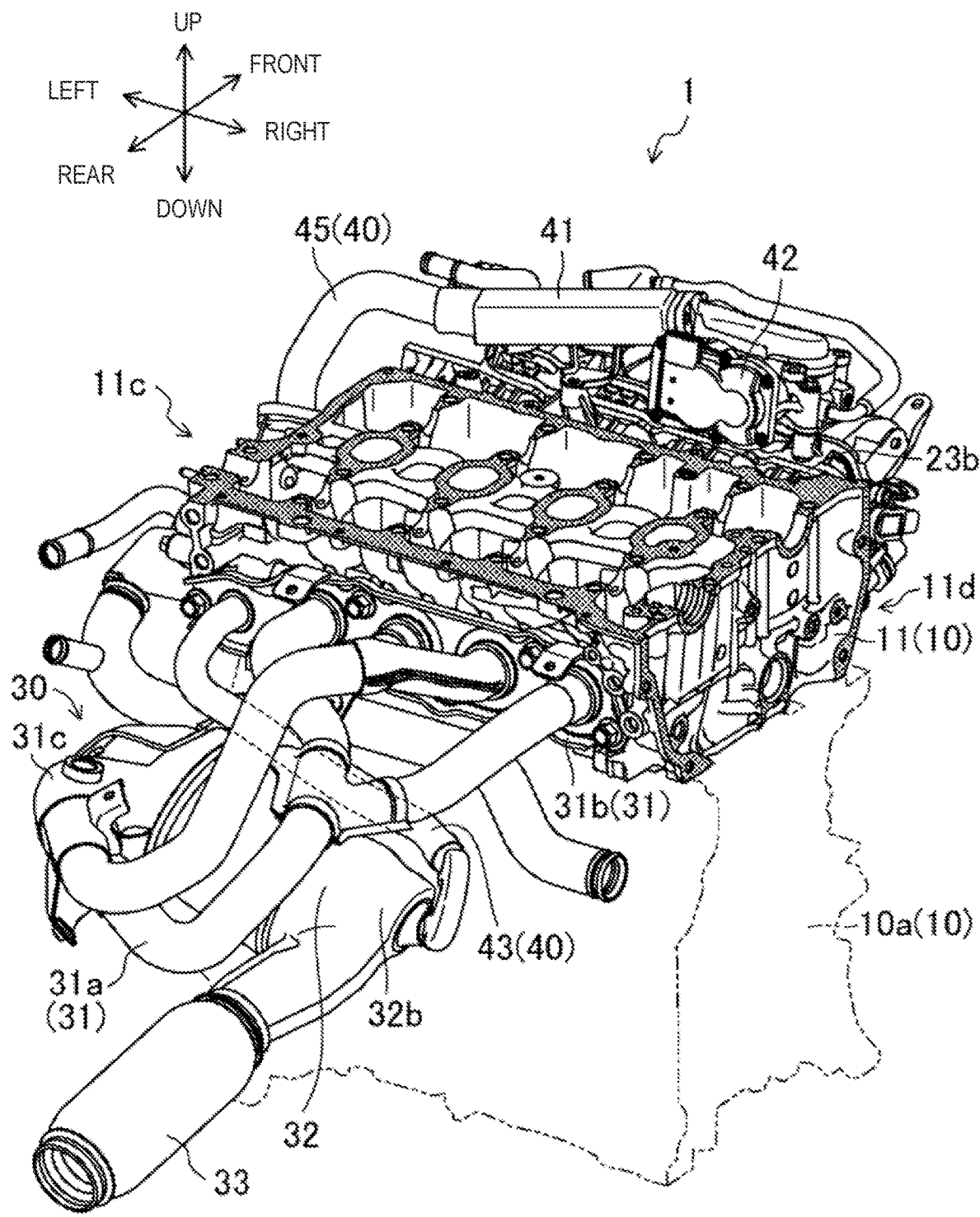
FIG. 2 is a schematic perspective view specifically illustrating an overall structure of the engine.
Figure 3:
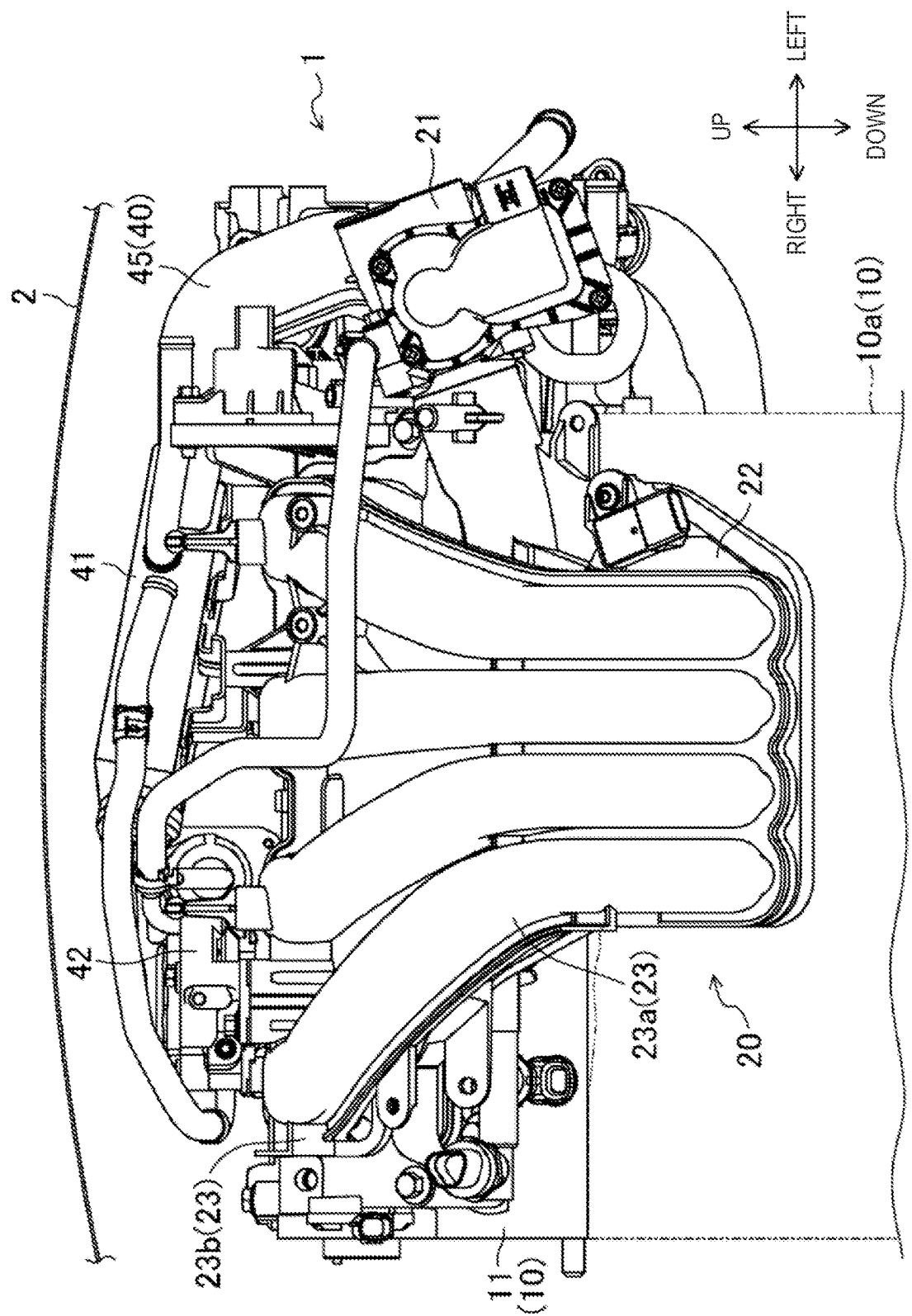
FIG. 3 is a schematic front view of an upper part of the engine.
Figure 4:
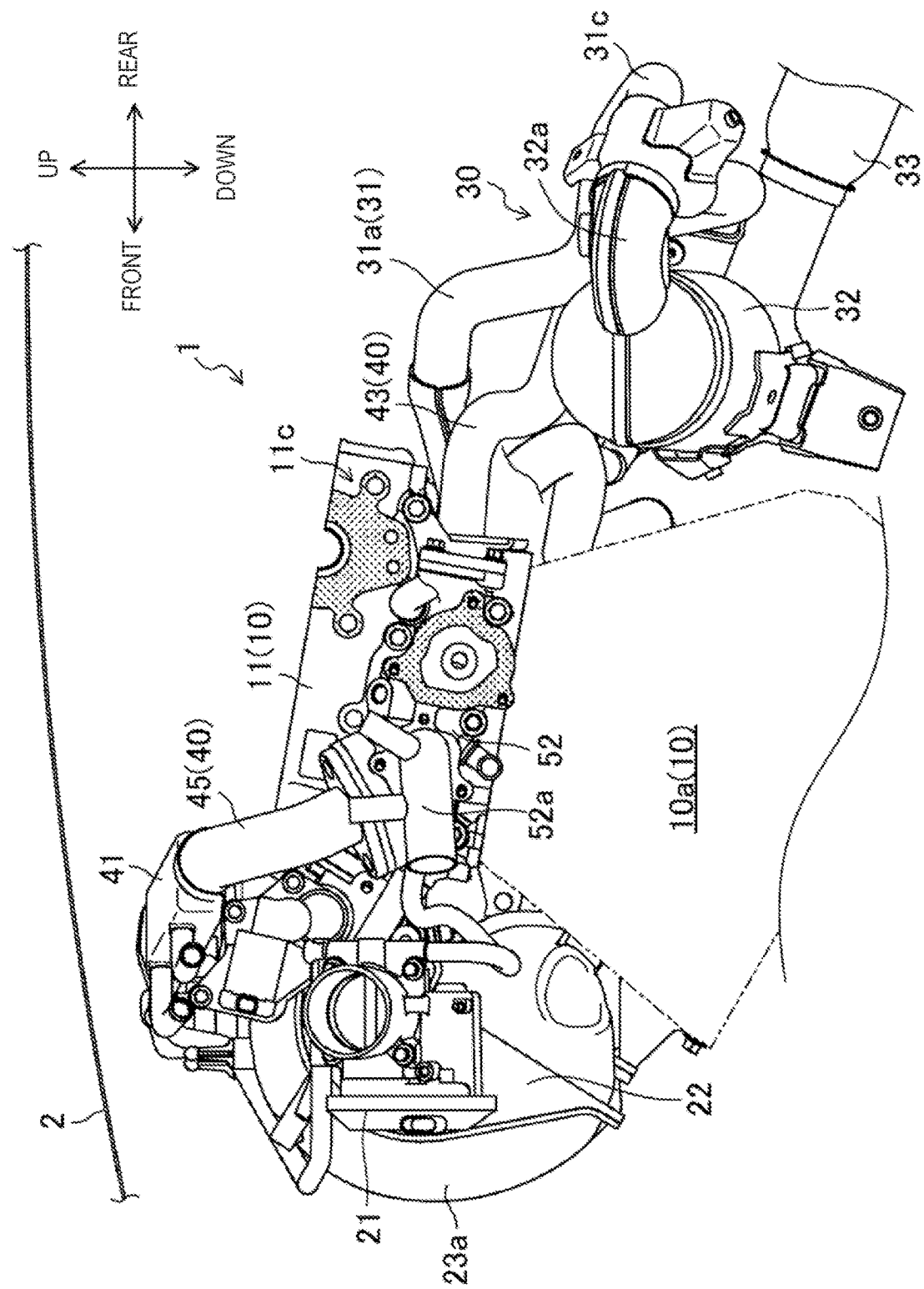
FIG. 4 is a schematic left-side view of the upper part of the engine.
Figure 5:
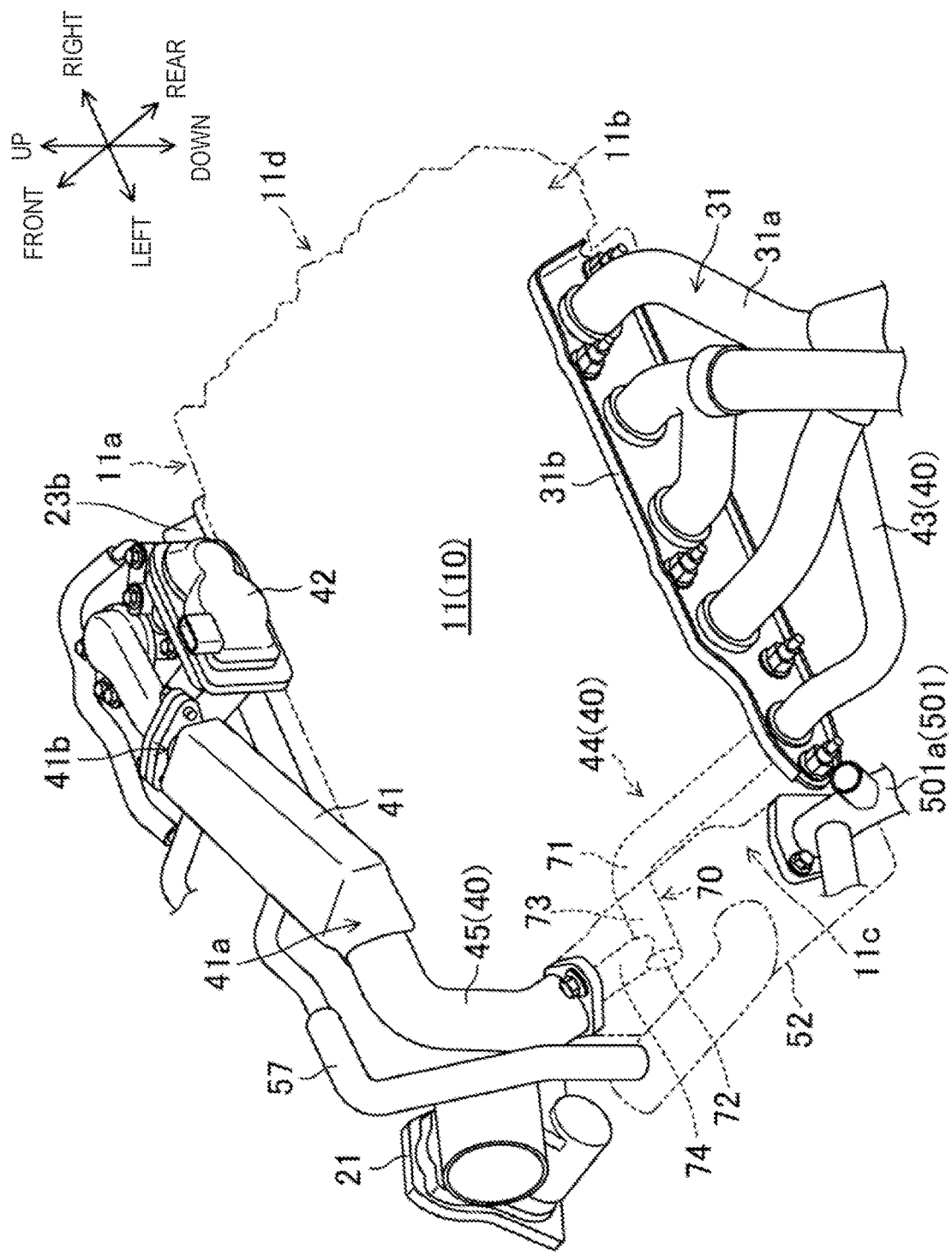
FIG. 5 is a schematic perspective view of the upper part of the engine, seen from an obliquely upper side.
Figure 6:
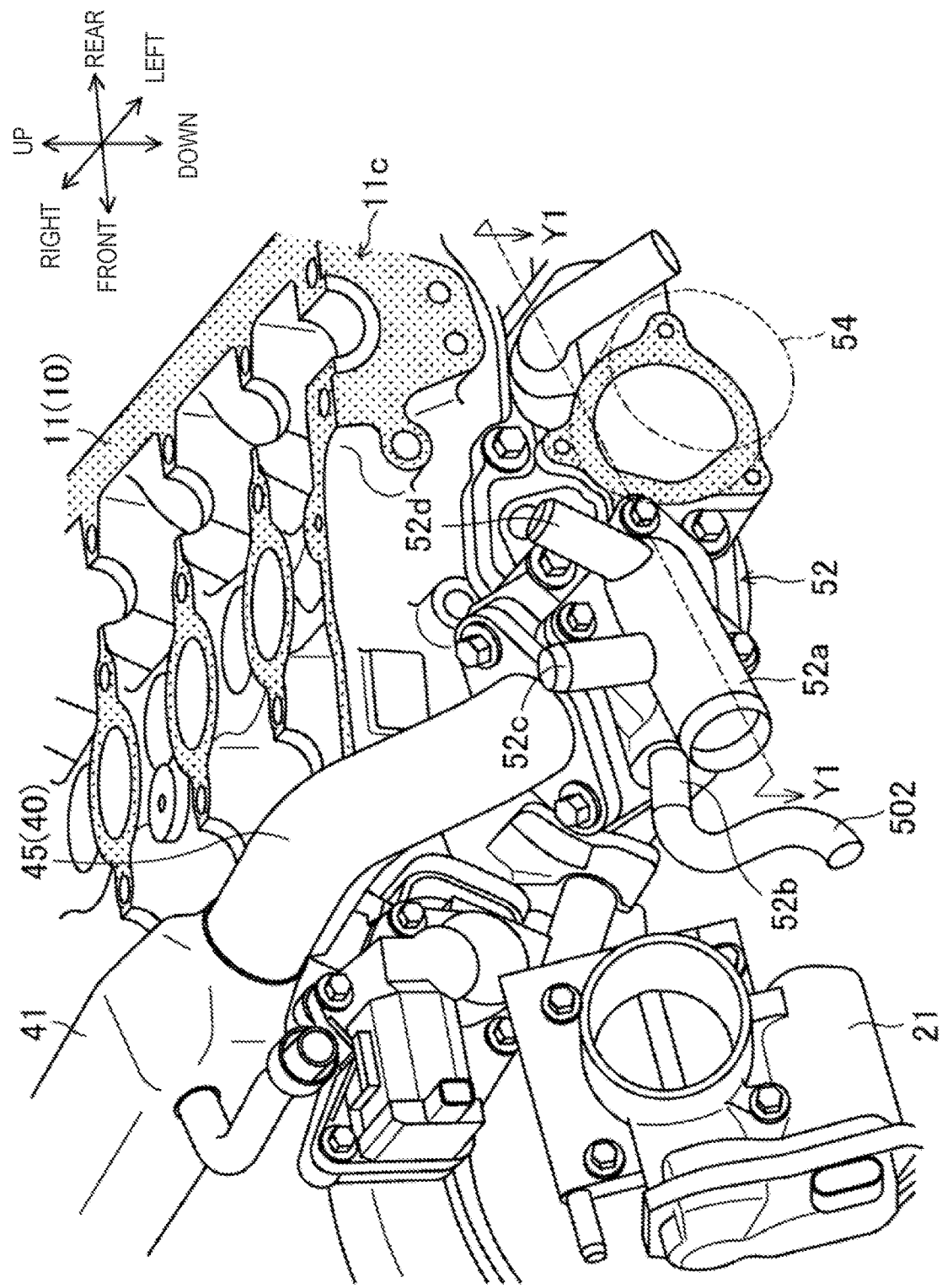
FIG. 6 is a schematic perspective view illustrating a part of the engine, in an enlarged manner.

FIG. 1 is a diagram illustrating main devices of an exhaust gas recirculation (EGR) system integrally configured with an engine (hereinafter, collectively referred to simply as the "engine 1"). FIG. 2 is a schematic perspective view specifically illustrating an overall structure of the engine 1. FIG. 3 is a schematic front view of an upper part of the engine 1. FIG. 4 is a schematic view of the upper part of the engine 1, seen from a side of a first end surface 11c of a cylinder head 11. FIG. 5 is a schematic perspective view of the upper part of the engine 1, seen from an obliquely upper side thereof. FIG. 6 is a schematic perspective view illustrating a part of the engine 1, in an enlarged manner.

Arrows illustrated in the drawings indicate directions of "front and rear," "left and right," and "up and down" used for description. Further, directions of "upstream" and "downstream" used for description are based on a flow direction of target fluid. For the sake of convenience, the illustration of the engine is partially omitted in the drawings.

The engine 1 is installed in a four-wheel automobile, for example in an engine bay of the automobile. As illustrated in FIGS. 3 and 4, the upper part of the engine 1 is covered by a bonnet 2. The automobile runs by a vehicle driver controlling an operation of the engine 1. The engine 1 combusts a mixture gas containing gasoline in combustion chambers 12 described later. The engine 1 is a four-stroke cycle engine which repeats an intake stroke, a compression stroke, an expansion stroke, and an exhaust stroke.

The engine 1 includes an intake passage 20 which sends intake air to each of the combustion chambers 12, and an exhaust passage 30 which discharges exhaust gas from the combustion chamber 12, in accordance with the combustion cycle. The engine 1 also includes the EGR system described above. That is, the engine 1 performs EGR in which a portion of the exhaust gas discharged to the exhaust passage 30 is recirculated back to the intake passage 20 as EGR gas.

In this engine 1, a circulation amount of the EGR gas is increased larger than a conventional amount to avoid abnormal combustion. Thus, a combustion with a stoichiometric air-fuel ratio as a target value is performed even when the engine 1 operates in a high load range.

Normally when the engine 1 operates in the high load range where a high torque output is required, a combustion temperature rises and abnormal combustion occurs. Therefore, in the high load range, an enrichment control in which a ratio of an air amount with respect to a fuel amount (so-called A/F, air-fuel ratio) is reduced is performed. Latent heat of vaporization of the fuel thus increased is used to cool the mixture gas in order to avoid abnormal combustion. However, in the enrichment control, the fuel amount increases and therefore fuel efficiency degrades.

Meanwhile, performing combustion at the stoichiometric air-fuel ratio, in which the fuel and oxygen combust proportionally, improves fuel efficiency. However, such combustion at the stoichiometric air-fuel ratio cannot utilize the latent heat of vaporization, and the abnormal combustion cannot be avoided. If the circulation amount of the EGR gas is increased in this case, an oxygen concentration of the intake air decreases. As a result, a self-ignition timing is delayed and abnormal combustion can be avoided.

This engine 1 performs combustion with the stoichiometric air-fuel ratio as the target value when operating in the high load range. Further the circulation amount of the EGR gas is increased to avoid abnormal combustion. The high load range referred to here is, for example, a range higher than a given load, including a full engine load, for example a high load range determined by bisecting an operating range of the engine 1 in the load direction. The high load range may be a highest load range determined by dividing the operating range of the engine 1 into three regions in the load direction.

When combusting at the stoichiometric air-fuel ratio, the temperature of the exhaust gas becomes high. Therefore, when the engine 1 operates in the high load range, EGR gas is recirculated in a larger amount and at a higher temperature compared to a conventional example. In this regard, the engine 1, specifically the EGR system thereof, is devised to resolve problems that occur accordingly (details will be described later).

<Engine Body 10>

As illustrated in FIG. 2, the engine 1 includes an engine body 10 comprised of a cylinder block 10a and the cylinder head 11. The cylinder head 11 is mounted on the cylinder block 10a. The cylinder head 11 constitutes the upper part of the engine body 10, and the cylinder block 10a constitutes a lower part of the engine body 10. The engine body 10 is formed with a plurality of combustion chambers 12. As illustrated in FIG. 1, the engine 1 of this example is a so-called four-cylinder engine having four combustion chambers 12.

The four combustion chambers 12 are arranged in line in an extending direction of a non-illustrated crankshaft (output shaft direction). The engine body 10 is longer in the output shaft direction. The engine body 10 is arranged transversely in the engine bay so that its output shaft direction substantially coincides with a vehicle width direction (a left-and-right direction).

Therefore, as illustrated in FIG. 1, when the cylinder head 11 is used as a reference, a pair of relatively long side surfaces of the cylinder head 11 face the front-and-rear direction, respectively (front side surface 11a and rear side surface 11b). The four combustion chambers 12 are arranged in line between left and right end faces (first end surface 11c and second end surface 11d) of the cylinder head 11. A part of the cylinder head 11 defined by a dotted line indicates a joint surface to which an attachment member is attached in FIG. 2.

Although not illustrated, four cylinders are formed in the cylinder block 10a. A reciprocatable piston is provided in each cylinder. A lower surface of each cylinder is closed by the piston. An upper surface of each cylinder is closed by the cylinder head 11. The engine body 10 is partitioned by the cylinder block 10a, the pistons, and the cylinder head 11 and thus the combustion chambers 12 are formed therein.

When the engine 1 is operating, the engine body 10 rises high in temperature. A cooling system which cools with cooling water is attached to the engine 1 to cool the engine body 10 (details will be described later). Note that although the engine 1 is also provided with a combustion supply system which supplies fuel to each combustion chamber 12, an ignition plug which ignites the mixture gas, a valve operating mechanism, etc., illustration and description thereof are omitted for the sake of convenience.

<Intake Passage 20>

Two intake ports 13 communicating with the combustion chamber 12 are formed in the front side surface 11a of the cylinder head 11. Each intake port 13 communicates with the combustion chamber 12 via an openable intake valve. In this engine 1, the intake port 13 is open to the front side surface 11a of the cylinder head 11 (a total of eight openings). The intake passage 20 is connected to the front side surface 11a of the cylinder head 11 so as to communicate with the intake port 13.

As illustrated in FIG. 1, the intake passage 20 is provided with a throttle valve 21, a surge tank 22, and an intake manifold 23. The throttle valve 21 adjusts an amount of air (fresh air) taken into the intake passage 20. As illustrated in FIGS. 3 and 4, the throttle valve 21 is arranged at a position forward and leftward of the upper part of the engine body 10.

The surge tank 22 is a large volume container and is arranged downstream of the throttle valve 21. As illustrated in FIGS. 3 and 4, the surge tank 22 is integrally formed with the intake manifold 23. The surge tank 22 is arranged near the front side of the engine body 10. The intake manifold 23 has four flow channels communicating with the surge tank 22, and the intake air is distributed to the combustion chambers 12 through these flow channels.

For example, the intake manifold 23 has four intake branch pipes 23a and a connecting bracket 23b. Each of the intake branch pipes 23a extends upward from a lower end of a front surface of the surge tank 22 while curving and branching. The intake branch pipe 23a further intersects the front surface of the surge tank 22 and then extends toward the front side surface 11a of the cylinder head 11.

As illustrated in FIG. 2, the connecting bracket 23b is a transversely long bracket in which the intake branch pipes 23a are connected to each other. The connecting bracket 23b is attached to the front side surface 11a of the cylinder head 11 to extend transversely along the cylinder head 11. As illustrated in FIG. 1, a plurality of branch passages 24a and 24b are formed inside the connecting bracket 23b to communicate the opening of each intake port 13 with a corresponding intake branch pipe 23a.

As illustrated in FIG. 1, a downstream end of each intake branch pipe 23a branches into two passages. Each of these passages is connected to a pair of branch flow channels (first branch passage 24a and second branch passage 24b) formed inside the connecting bracket 23b.

A swirl control valve 25 is provided in each first branch passage 24a. The swirl control valve 25 adjusts an opening of the flow channel of the first branch passage 24a. These swirl control valves 25 are collectively driven by a single drive motor 26 attached to the engine body 10. By controlling the swirl control valve 25, the strength of a swirl flow generated in the combustion chamber 12 changes.

Note that this engine 1 does not perform forced induction. The engine 1 performs intake at atmospheric pressure. This engine 1 is a so-called naturally aspirated engine.

<Exhaust Passage 30>

As illustrated in FIG. 1, two exhaust ports 14 communicating with each combustion chamber 12 are formed on the rear side surface 11b of the cylinder head 11. Each exhaust port 14 communicates with the combustion chamber 12 via an openable exhaust valve. In this engine 1, the rear side surface 11b of the cylinder head 11 is formed with exits at which the exhaust ports 14 merge (total of four exits). The exhaust passage 30 is connected to the rear side surface 11b of the cylinder head 11 to communicate with the exhaust ports 14.

The exhaust passage 30 is provided with an exhaust manifold 31 and an exhaust emission control system 32. As illustrated in FIGS. 2 and 5, the exhaust manifold 31 has a pipe group 31a comprised of a plurality of pipes and a connecting bracket 31b. The pipe group 31a branches into four flow channels communicating with the corresponding exhaust ports 14. The connecting bracket 31b is formed by a transversely long plate-shaped bracket.

An upstream end part of the pipe group 31a is attached to the connecting bracket 31b. The connecting bracket 31b is attached to the rear side surface 11b of the cylinder head 11 so that each of the pipes constituting the pipe group 31a communicates with the exhaust port 14. A downstream end part of the pipe group 31a joins into a single flow channel (merging portion 31c). The exhaust manifold 31 is connected to a gas introduction part 32a of the exhaust emission control system 32 via the merging portion 31c.

As illustrated in FIGS. 2 and 4, the exhaust emission control system 32 has a capsule-shaped case. The exhaust emission control system 32 is disposed near a rear end of the engine body 10. The case contains therein a three-way catalyst and a filter. A gas outflow part 32b of the exhaust emission control system 32 is connected with a flexible pipe 33 extending rearward. An exhaust pipe (not illustrated) extends outside the engine bay via the flexible pipe 33.

<EGR Passage 40>

As illustrated in FIG. 1, an EGR passage 40 connects the exhaust passage 30 to the intake passage 20. The EGR gas flows through the EGR passage 40 in an arrow direction. For example, an upstream end portion of the EGR passage 40 is connected to a position of the exhaust passage 30 downstream of the exhaust emission control system 32. A downstream end portion of the EGR passage 40 is connected to a position of the intake passage 20 between the throttle valve 21 and the surge tank 22.

The EGR passage 40 is provided with an EGR cooler 41 and an EGR valve 42. The EGR cooler 41 has a gas inflow port 41a at its one end and a gas outflow port 41b at the other end. The EGR cooler 41 cools the EGR gas (a portion of the exhaust gas) flowing in from the gas inflow port 41a and out from the gas outflow port 41b. The EGR valve 42 adjusts the flow rate of the EGR gas flowing through the EGR passage 40. The EGR valve 42 is disposed downstream of the EGR cooler 41. The EGR passage 40, the EGR cooler 41, and the EGR valve 42 constitute the "EGR system."

As illustrated in FIGS. 2, 3 and 5, the EGR cooler 41 and the EGR valve 42 are disposed adjacent to each other above the intake manifold 23. As illustrated in FIG. 1, the EGR passage 40 is comprised of an EGR introduction pipe 43, an EGR internal passage 44, and a relay pipe 45.

The EGR introduction pipe 43 constitutes an upstream portion of the EGR passage 40. As illustrated in FIG. 2, an upstream end portion of the EGR introduction pipe 43 is connected to the gas outflow part 32b of the exhaust emission control system 32. As illustrated in FIGS. 2 and 5, a downstream end portion of the EGR introduction pipe 43 is attached to an end part of the connecting bracket 31b. The EGR introduction pipe 43 is attached to the rear side surface 11b of the cylinder head 11 via the connecting bracket 31b. The EGR introduction pipe 43 extends upward in the downstream direction.

The EGR internal passage 44 is a tubular passage formed in the cylinder head 11. The EGR internal passage 44 passes through the cylinder head 11. The EGR introduction pipe 43 communicates with the EGR internal passage 44.

As illustrated in FIG. 1, a passage through which cooling water flows (water-cooling passage 50) is formed inside the cylinder head 11. The EGR internal passage 44 removes the excess heat of the EGR gas flowing inside the water-cooling passage 50 by exchanging heat with the cooling water flowing therein. In this engine 1, by devising the shape and arrangement of the EGR system, the EGR gas is effectively cooled before flowing into the EGR cooler 41 (the EGR internal passage 44 will be described later in detail).

As illustrated in FIGS. 5 and 6, the relay pipe 45 connects to the gas inflow port 41a of the EGR cooler 41. The relay pipe 45 extends toward the first end surface 11c of the cylinder head 11. A water outlet 52 (described later) is attached to the first end surface 11c of the cylinder head 11. An upstream end portion of the relay pipe 45 is connected to the water outlet 52. As a result, the relay pipe 45 communicates with the EGR internal passage 44.

<Water-Cooling System>

Figure 7:
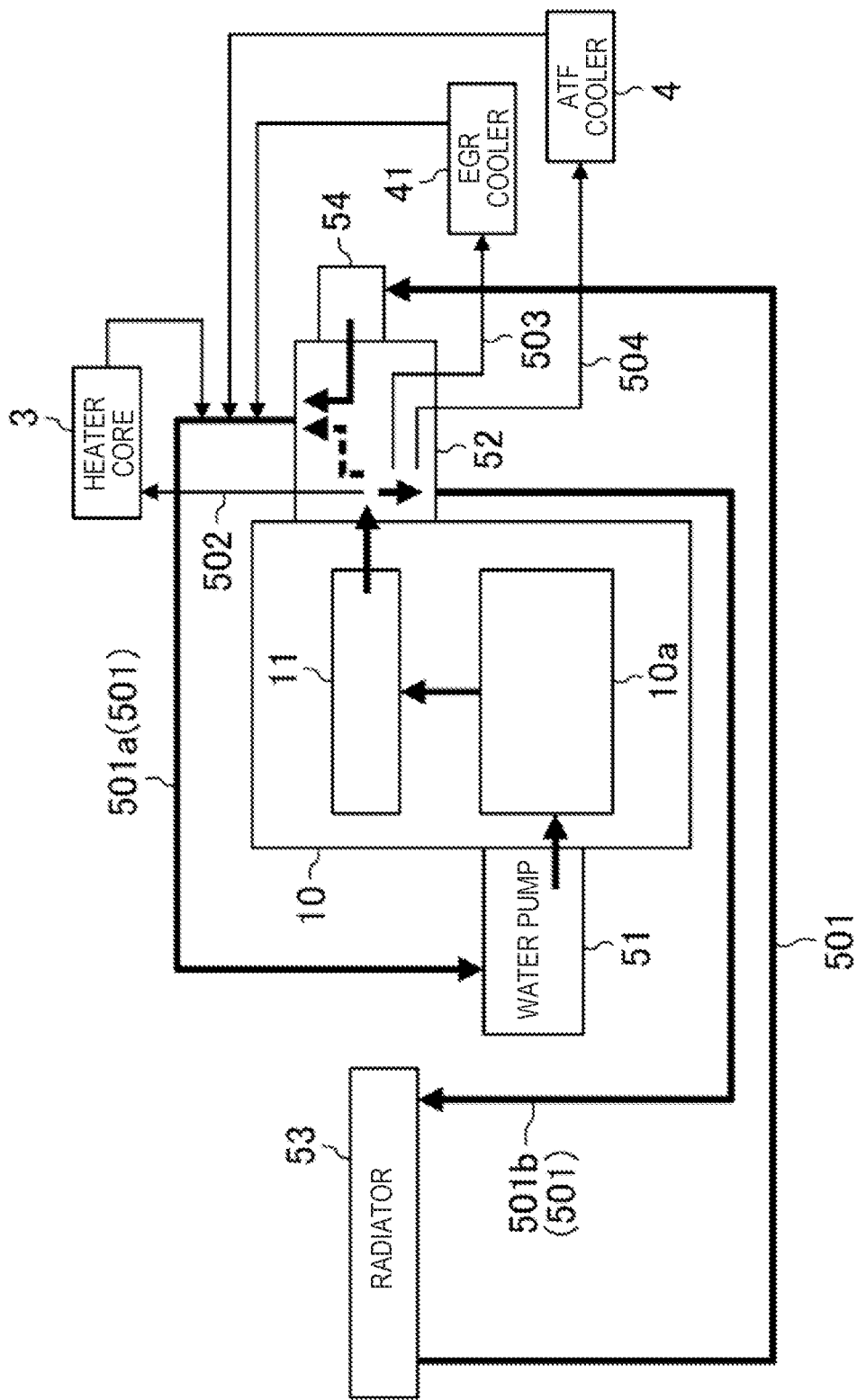
FIG. 7 is a circuit diagram of a water-cooling system attached to the engine.

FIG. 7 is a circuit diagram of the water-cooling system attached to the engine 1. The cooling system includes a water pump 51, the water outlet 52, a radiator 53, and a plurality of water-cooling passages 50. The water-cooling system cools the engine body 10, a heater core 3 for air conditioning, the EGR cooler 41, and an ATF cooler 4 (a cooler which cools oil used in transmission) by exchanging heat with the cooling water.

The radiator 53 is disposed near a front grill in the engine bay. The radiator 53 cools the cooling water by exchanging heat with traveling wind. The water pump 51 is disposed on a side surface of the cylinder block 10a. The water pump 51 operates in synchronization with the operation of the engine body 10. The water pump 51 circulates the cooling water through the plurality of water-cooling passages 50.

The water-cooling passages 50 include a main water-cooling passage through which the cooling water circulates through the engine body 10 (first water-cooling passage 501), and sub water-cooling passages branching from the first water-cooling passage 501 and through which the cooling water circulates the ATF cooler 4, the EGR cooler 41, and the heater core 3 (second to fourth water-cooling passages 502 to 504). The flow rate of the cooling water is significantly higher in the main water-cooling passage than in each sub water-cooling passage.

The first water-cooling passage 501 is constituted by a shorter path in which the cooling water discharged by the water pump 51 flows through the cylinder block 10a, and the cylinder head 11, and then returns to the water pump 51 in this order, and a longer path in which the cooling water flows through the cylinder block 10a, the cylinder head 11, and the radiator 53, and then returns to the water pump 51 in this order. The water outlet 52 switches the path between the shorter and longer paths.

Figure 8:
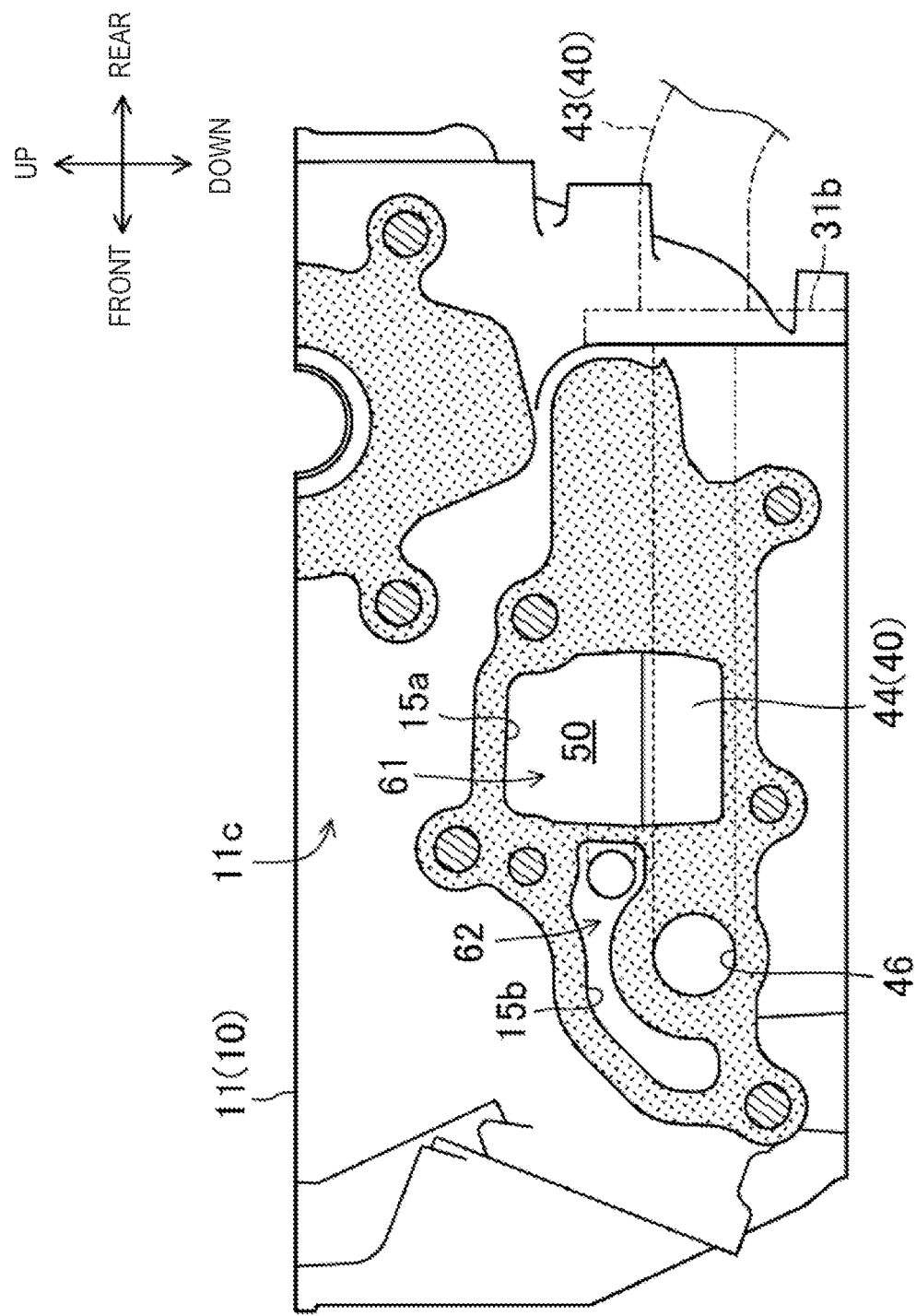
FIG. 8 is a schematic view illustrating a first end surface of a cylinder head.

The water outlet 52 is made of metal casting and is attached to the cylinder head 11. For example, as illustrated in FIG. 8, exits of the water-cooling passages 50 inside the cylinder head 11 open to the first end surface 11c of the cylinder head 11. Specifically, a first exit 15a forming an exit of the first water-cooling passage 501 and a second exit 15b forming an exit of the second water-cooling passage 502 are open. The water outlet 52 is attached to the first end surface 11c.

A thermostat 54 (indicated by a two-dotted chain line in FIG. 6) is attached to the water outlet 52. The thermostat 54 switches between the shorter path and the longer path of the first water-cooling passage 501.

A portion of the first water-cooling passage 501 which returns the cooling water back to the water pump 51 (main water circulating portion 501a) is connected to the rear end of the water outlet 52 as illustrated in FIG. 5. A portion of the first water-cooling passage 501 which sends the cooling water to the radiator 53 (main water supply passage 501b) is connected to a front side portion of the water outlet 52 (first water outflow port 52a illustrated in FIG. 6).

The water outlet 52 also distributes a portion of the cooling water flowing through the first water-cooling passage 501 to a plurality of water-cooling passages. Specifically, the sub water-cooling passages described above (second to fourth water-cooling passages 502 to 504) are connected to the water outlet 52. As illustrated in FIG. 6, the third water-cooling passage 503 which circulates the cooling water through the EGR cooler 41 is connected to a third water outflow port 52c branched from the first water outflow port 52a. Further, the fourth water-cooling passage 504 which circulates the cooling water to the ATF cooler 4 is connected to a fourth water outflow port 52d branched from the first water outflow port 52a.

The second water-cooling passage 502 which circulates the cooling water to the heater core 3 is connected to a second water outflow port 52b formed in the front end of the water outlet 52. The water outlet 52, while circulating the cooling water in the first water-cooling passage 501, distributes and sends a portion of the cooling water to each of the second to fourth water-cooling passages 502 to 504.

As illustrated in FIG. 7, downstream end portions of the second to fourth water-cooling passages 502 to 504 are respectively connected to the downstream portion of the first water-cooling passage 501. As a result, the cooling water flowed through each of the second to fourth water-cooling passages 502 to 504 is returned to the downstream portion of the first water-cooling passage 501.

<EGR Internal Passage 44>

As described above, this engine 1 performs combustion with the stoichiometric air-fuel ratio as the target value when operating in the high load range. Further the circulation amount of the EGR gas is increased to avoid abnormal combustion. Therefore, the EGR gas flows through the EGR passage 40 in a larger amount and at a higher temperature compared to a conventional example.

As a result, an amount of heat exceeding the cooling performance of the EGR cooler 41 may be added to the EGR cooler 41 and the durability of the EGR cooler 41 may degrade. On the other hand, in this engine 1, by devising the shape and arrangement of the EGR internal passage 44, the EGR gas flowing into the EGR cooler 41 is effectively cooled and the excess heat thereof is removed.

Figure 9:
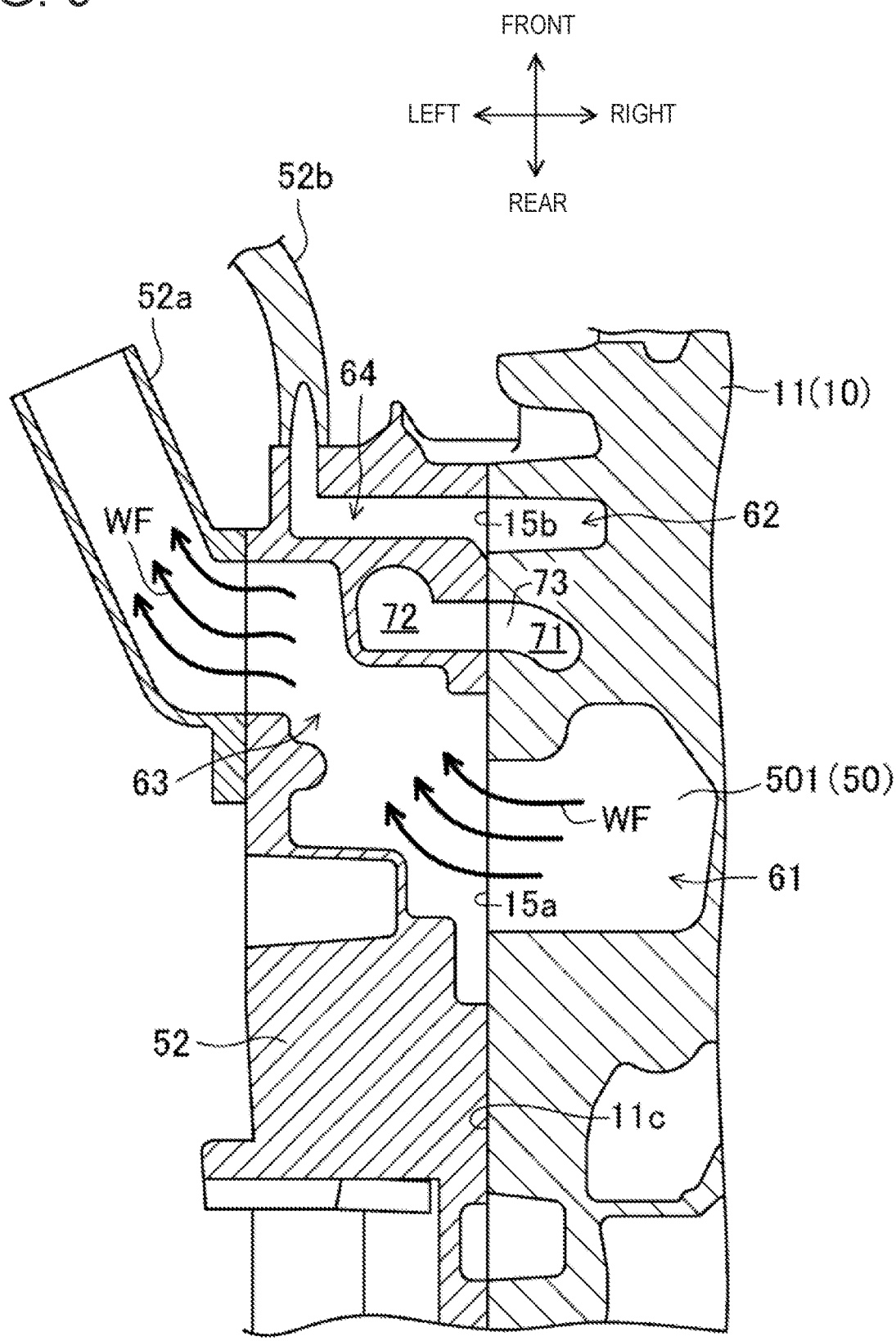
FIG. 9 is a schematic cross-sectional view of a part indicated by an arrow line Y1-Y1 in FIG. 6.
Figure 10:
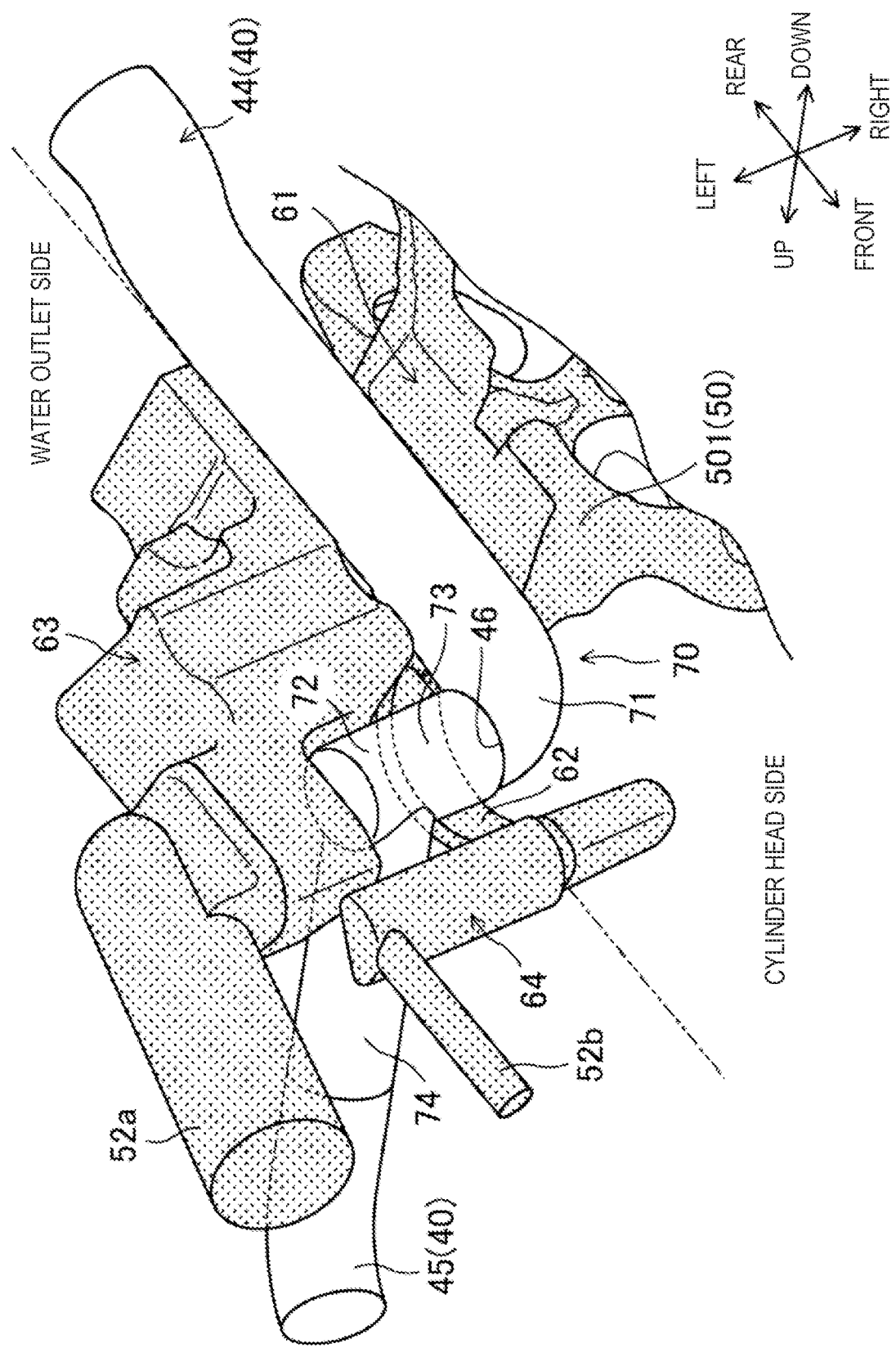
FIG. 10 is a schematic perspective view illustrating a core shape of an exhaust gas recirculation (EGR) internal passage and a water-cooling passage.

FIG. 9 is a schematic cross-sectional view of a part indicated by an arrow line Y1-Y1 in FIG. 6. FIG. 10 is a schematic perspective view illustrating a core shape of the EGR internal passage 44 and the water-cooling passage 50 (shapes of the respective passages themselves). In FIG. 10, the water-cooling passage 50 through which the cooling water flows is illustrated with dots. The EGR internal passage 44 is not only formed inside the cylinder head 11 but also inside the water outlet 52.

As illustrated in FIGS. 1, 5 and 8, an upstream end portion of the EGR internal passage 44 is open to the left side of the rear side surface 11b of the cylinder head 11 (near the first end surface 11c). The upstream end portion of the EGR internal passage 44 is connected to the EGR introduction pipe 43. The upstream portion of the EGR internal passage 44 extends inside the cylinder head 11 toward the front side surface 11a along the first end surface 11c. The upstream portion of the EGR internal passage 44 extends substantially horizontal.

Further as illustrated in FIGS. 8 and 10, the upstream portion of the EGR internal passage 44 is arranged so that a part thereof intersects the water-cooling passage 50 therein (first cooling portion CP1 illustrated in FIG. 1).

For example, the first cooling portion CP1 extends along an edge of the first exit 15a of the first water-cooling passage 501 where the flow rate of cooling water is at a highest rate and a cross section of the flow channel has a largest area. In the first cooling portion CP1, the EGR gas flowing in the EGR internal passage 44 is indirectly in contact with the cooling water flowing in the first water-cooling passage 501 via a thin pipe wall. Therefore, heat is exchanged efficiently and the EGR gas is effectively cooled.

Further, a bent pipe part 70 is provided in a downstream portion of the EGR internal passage 44 connecting to the first cooling portion CP1. The bent pipe part 70 includes a first bent portion 71, a second bent portion 72, and an intermediate portion 73. The second bent portion 72 is located downstream of the first bent portion 71. The intermediate portion 73 connects the first bent portion 71 to the second bent portion 72 by being disposed therebetween.

The first bent portion 71 is disposed inside the cylinder head 11. As illustrated in FIGS. 5 and 10, the first bent portion 71 bends the EGR internal passage 44 substantially perpendicularly. In detail, the intermediate portion 73 connected to a downstream side of the first bent portion 71 extends toward the first end surface 11c.

As illustrated in FIGS. 5, 9, and 10, the intermediate portion 73 is arranged over both the cylinder head 11 and the water outlet 52. The part of the intermediate portion 73 located inside the cylinder head 11 is connected to the part of the intermediate portion 73 located inside the water outlet 52 via a gas exit 46 illustrated in FIG. 8.

The second bent portion 72 is disposed inside the water outlet 52. The second bent portion 72 bends the EGR internal passage 44 substantially perpendicularly. As illustrated in FIGS. 5 and 10, a downstream portion of the EGR internal passage 44 connected to a downstream side of the second bent portion 72 (downstream EGR internal passage 74) extends upward while slightly inclined forward. The downstream EGR internal passage 74 communicates with the relay pipe 45.

As described above, the EGR cooler 41 is disposed on the upper side of the intake manifold 23. Therefore, the EGR cooler 41 is located on the upper side of the EGR internal passage 44. As a result, the downstream EGR internal passage 74 is bent by the second bent portion 72 toward the gas inflow port 41a, that is in a forward and upward direction. On the other hand, the upstream portion of the EGR internal passage 44 is bent by the first bent portion 71 away from the gas inflow port 41a, that is in a rearward direction.

Since the downstream EGR internal passage 74 is bent toward the gas inflow port 41a, the EGR internal passage 44 is smoothly connected to the gas inflow port 41a, which generates a smooth flow of the EGR gas. Moreover, since the downstream EGR internal passage 74 extends upward, even if condensed water is generated in the EGR internal passage 44, the condensed water does not flow into the downstream side of the EGR internal passage 44. Therefore, the durability of the EGR cooler 41 improves.

Since the downstream portion of the EGR internal passage 44 extends in an opposite direction from its upstream portion, the EGR internal passage 44 located on the upstream side of the EGR cooler 41 is extended and thus a sufficient length of the first cooling portion CP1 is secured. Further, since the first bent portion 71 and the second bent portion 72 are sharply bendable, the EGR gas is effectively cooled before flowing into the EGR cooler 41.

That is, as illustrated in FIGS. 9 and 10, the water-cooling passage 50 is disposed around the bent pipe part 70, and the excess heat is efficiently removed from the EGR gas flowing through the bent pipe part 70.

As illustrated in FIG. 8, the first end surface 11c of the cylinder head 11 is formed with the first exit 15a having a large rectangular opening and the second exit 15b extending in an arc shape along a circumference of the gas exit 46. As illustrated in FIGS. 8, 9, and 10, the water-cooling passage 50 (first water-cooling passage 501) branches into a main-stream passage 61 extending toward the first exit 15a and a side-stream passage 62 extending toward the second exit 15b, near the first end surface 11c. The main-stream passage 61 constitutes a portion of the first water-cooling passage 501, and the side-stream passage 62 constitutes a portion of the second water-cooling passage 502.

The side-stream passage 62 is an arc-shaped flow channel having the same flow channel cross portion as the second exit 15b. The side-stream passage 62 communicates with the main-stream passage 61 through a water through-hole having a small diameter. An intermediate portion of the side-stream passage 62 is closed by the water outlet 52. The second exit 15b has a significantly smaller flow channel cross section than the first exit 15a.

The water-cooling passage 50 is also formed inside the water outlet 52. For example, a first outflow passage 63 constituting a portion of the first water-cooling passage 501 and a second outflow passage 64 constituting a portion of the second water-cooling passage 502 are formed inside the water outlet 52. The first outflow passage 63 has a larger flow channel cross section and is connected to the main-stream passage 61 via the first exit 15a. The first outflow passage 63 is also connected to the side-stream passage 62 via one end of the second exit 15b.

The second outflow passage 64 is an elongated passage. The second outflow passage 64 is connected to the side-stream passage 62 via the other end of the second exit 15b. The cross section of the second outflow passage 64 is significantly smaller than that of the first outflow passage 63.

As illustrated in FIG. 9, the first outflow passage 63 extends leftward as well as forward while slightly inclining from the first exit 15a. The first outflow passage 63 communicates with the first outflow port 52a. The second outflow passage 64 extends to the left. The second outflow passage 64 communicates with the second water outflow port 52b.

As illustrated in FIGS. 8, 9, and 10, the first bent portion 71 and the intermediate portion 73 are surrounded by the main- and side-stream passages 61 and 62. As a result, the first bent portion 71 and the intermediate portion 73 are in contact with the main- and side-stream passages 61 and 62 via a pipe wall.

Further, the second bent portion 72 projects into the first outflow passage 63. For example, as indicated by a plurality of arrows WF in FIG. 9, the cooling water flows inside the first outflow passage 63 along the shape of its flow channel. The bent section of the second bent portion 72 is disposed to be near a center of the flow of the cooling water.

Further, sections of the second bent portion 72 and the intermediate portion 73 that do not project into the first outflow passage 63 are surrounded by the second outflow passage 64 as illustrated in FIGS. 8, 9, and 10. As a result, these sections of the second bent portion 72 and the intermediate portion 73 are in contact with the second outflow passage 64 via the pipe wall.

By forming such a bent pipe part 70 in the EGR internal passage 44, the EGR gas flowing through the EGR internal passage 44 collides with a wall surface thereof at each bent section of the first bent portion 71 and the second bent portion 72. The flow of EGR gas stagnates at the bent pipe part 70. As a result, heat dissipation of the EGR gas in the bent pipe part 70 improves. Further, the water-cooling passage 50 is disposed around the bent pipe part 70. Therefore, the heat exchange between the EGR gas and the cooling water is promoted. That is, the EGR gas is effectively cooled by the combination of the bent pipe part 70 and the water-cooling passage 50 (second cooling portion CP2 illustrated in FIG. 1).

The bent pipe part 70 is not only disposed in the cylinder head 11 but also in the water outlet 52. As a result, the effectively coolable range is expanded, and the EGR gas is cooled even more.

In particular, the bent section of the second bent portion 72 projects into the first outflow passage 63 where the flow rate of the cooling water is at the highest rate. As a result, the cooling water comes into contact with the bent section of the second bent portion 72 in a state where the heat exchange efficiency is at its highest level. Therefore, the heat exchange between the EGR gas and the cooling water is promoted, and the EGR gas is further cooled.

Moreover, the sections of the second bent portion 72 and the intermediate portion 73 that do not project into the first outflow passage 63 are also in contact with the second outflow passage 64 via the pipe wall. The EGR gas is cooled by heat exchange with the cooling water flowing through one of the first outflow passage 63 and the second outflow passage 64 in major sections of the second bent portion 72 and the intermediate portion 73. Therefore, the cooling performance of the EGR gas further improves.

As described above, in the engine 1, the EGR internal passage 44 having a structure and arrangement capable of effectively cooling the EGR gas by heat exchange with the cooling water is provided in the portion of the EGR passage 40 upstream of the EGR cooler 41. Therefore, the excess heat of the EGR gas is effectively removed, and the durability of the EGR cooler 41 improves.

Thus, the EGR gas is recirculated in a larger amount at a higher temperature compared to a conventional example. As a result, when the engine operates in the high load range, even if the combustion is performed with the stoichiometric air-fuel ratio as the target value, the circulation amount of the EGR gas is increased to avoid abnormal combustion. Therefore, this engine 1 is improved in fuel efficiency.

Note that the EGR system of the engine according to the present disclosure is not limited to the above embodiment and includes various other configurations. For example, although the gasoline engine is illustrated in the above embodiment, the present disclosure is applicable to a diesel engine. Moreover, although the naturally aspirated engine is illustrated, the present disclosure is applicable to an engine with a forced induction system.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
10 Engine Body
10a Cylinder Block
11 Cylinder Head
11a Front Side Surface
11b Rear Side Surface
11c First End Surface
11d Second End Surface
12 Combustion Chamber
20 Intake Passage
21 Throttle Valve
22 Surge Tank
23 Intake Manifold
30 Exhaust Passage
31 Exhaust Manifold
32 Exhaust Emission Control System
40 EGR Passage
41 EGR Cooler
42 EGR Valve
43 EGR Introduction Pipe
44 EGR Internal Passage
45 Relay Pipe
50 Water-Cooling Passage
51 Water Pump
52 Water Outlet
53 Radiator
63 First Outflow Passage
64 Second Outflow Passage
70 Bent Pipe Part
71 First Bent Portion
72 Second Bent Portion
73 Intermediate Portion

What is claimed is:

1. An exhaust gas recirculation (EGR) system of an engine, comprising:
   an engine body including:
      a combustion chamber in which combustion is performed; and
      a cylinder head provided in an upper part of the engine body and having a water-cooling passage through which cooling water flows;
   an intake passage connected to the cylinder head and through which intake air is introduced into the combustion chamber;
   an exhaust passage connected to the cylinder head and through which exhaust gas is discharged from the combustion chamber; and
   an EGR passage connecting the exhaust passage to the intake passage and configured to recirculate the exhaust gas as EGR gas, from the exhaust passage to the intake passage, the EGR passage including:
      an EGR cooler configured to cool the EGR gas; and
      an EGR internal passage constituting the EGR passage upstream of the EGR cooler, and including a passage passing through the cylinder head,
   wherein the EGR internal passage has a bent pipe part including:
      a first bent portion at which an upstream portion of the EGR internal passage is bent away from a gas inflow port of the EGR cooler;
      a second bent portion located downstream of the first bent portion and bending the EGR internal passage toward the gas inflow port; and
      an intermediate portion connecting the first bent portion to the second bent portion by being disposed therebetween, and
   wherein the water-cooling passage is disposed around the bent pipe part.

2. The EGR system of claim 1, wherein the EGR cooler is located on an upper side of the EGR internal passage, and a portion of the EGR internal passage downstream of the second bent portion extends upward toward the gas inflow port.

3. The EGR system of claim 2, wherein at least a portion of the EGR internal passage upstream of the first bent portion intersects the water-cooling passage.

4. The EGR system of claim 3, further comprising a water outlet attached to an end surface of the cylinder head and including therein a plurality of outflow passages configured to distribute cooling water to a plurality of water outflow ports, respectively, the outflow passages and the water outflow ports constituting a portion of the water-cooling passage,
   wherein a downstream portion of the bent pipe part including the second bent portion is located inside the water outlet and partially projects into a first outflow passage having a largest flow channel cross section among the plurality of outflow passages.

5. The EGR system of claim 4, wherein the downstream portion of the bent pipe part other than the portion projecting into the first outflow passage is in contact with a second outflow passage that is different from the first outflow passage.

6. The EGR system of claim 5, wherein when the engine operates in a high load range including a full load, the engine performs combustion with a stoichiometric air-fuel ratio as a target value.

7. The EGR system of claim 1, wherein at least a portion of the EGR internal passage upstream of the first bent portion intersects the water-cooling passage.

8. The EGR system of claim 7, further comprising a water outlet attached to an end surface of the cylinder head and including therein a plurality of outflow passages configured to distribute cooling water to a plurality of water outflow ports, respectively, the outflow passages and the water outflow ports constituting a portion of the water-cooling passage, wherein a downstream portion of the bent pipe part including the second bent portion is located inside the water outlet and partially projects into a first outflow passage having a largest flow channel cross section among the plurality of outflow passages.

9. The EGR system of claim 8, wherein a downstream portion of the bent pipe part other than a portion projecting into the first outflow passage is in contact with a second outflow passage that is different from the first outflow passage.

10. The EGR system of claim 1, wherein when the engine operates in a high load range including a full load, the engine performs combustion with a stoichiometric air-fuel ratio as a target value.

11. The EGR system of claim 2, further comprising a water outlet attached to an end surface of the cylinder head and including therein a plurality of outflow passages configured to distribute cooling water to a plurality of water outflow ports, respectively, the outflow passages and the water outflow ports constituting a portion of the water-cooling passage, wherein a downstream portion of the bent pipe part including the second bent portion is located inside the water outlet and partially projects into a first outflow passage having a largest flow channel cross section among the plurality of outflow passages.

12. The EGR system of claim 11, wherein a downstream portion of the bent pipe part other than a portion projecting into the first outflow passage is in contact with a second outflow passage that is different from the first outflow passage.

13. The EGR system of claim 2, wherein when the engine operates in a high load range including a full load, the engine performs combustion with a stoichiometric air-fuel ratio as a target value.

14. The EGR system of claim 3, wherein when the engine operates in a high load range including a full load, the engine performs combustion with a stoichiometric air-fuel ratio as a target value.

15. The EGR system of claim 4, wherein when the engine operates in a high load range including a full load, the engine performs combustion with a stoichiometric air-fuel ratio as a target value.

16. The EGR system of claim 1, further comprising a water outlet attached to an end surface of the cylinder head and including therein a plurality of outflow passages configured to distribute cooling water to a plurality of water outflow ports, respectively, the outflow passages and the water outflow ports constituting a portion of the water-cooling passage, wherein a downstream portion of the bent pipe part including the second bent portion is located inside the water outlet and partially projects into a first outflow passage having a largest flow channel cross section among the plurality of outflow passages.

17. The EGR system of claim 16, wherein the downstream portion of the bent pipe part other than the portion projecting into the first outflow passage is in contact with second outflow passage that is different from the first outflow passage.

18. The EGR system of claim 12, wherein when the engine operates in a high load range including a full load, the engine performs combustion with a stoichiometric air-fuel ratio as a target value.

* * * * *